US006275570B1

(12) United States Patent
Homan et al.

(10) Patent No.: US 6,275,570 B1
(45) Date of Patent: Aug. 14, 2001

(54) SYSTEM AND METHOD OF PROVISIONING SUBSCRIBERS IN A MESSAGING ENVIRONMENT COMPRISING TWO MESSAGING SYSTEMS

(75) Inventors: John L. Homan, Ephrata; James J. Keeley, Erdenheim, both of PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/064,279

(22) Filed: Apr. 22, 1998

(51) Int. Cl.⁷ .................................................. H04M 1/64
(52) U.S. Cl. ............................. 379/88.17; 379/201.12; 379/89.75
(58) Field of Search ........................ 379/88.13, 88.14, 379/88.17, 88.18, 88.22, 88.23, 88.26, 88.27, 201.12

(56) References Cited

U.S. PATENT DOCUMENTS

| | | |
|---|---|---|
| 5,193,110 | 3/1993 | Jones et al. . |
| 5,260,990 | 11/1993 | MeLampy et al. . |
| 5,329,579 | 7/1994 | Brunson . |
| 5,406,557 | 4/1995 | Baudoin . |
| 5,479,411 | 12/1995 | Klein . |
| 5,493,607 | 2/1996 | Arumainayagam et al. . |
| 5,519,766 | 5/1996 | Jones . |
| 5,524,139 | 6/1996 | Jones . |
| 5,621,727 | 4/1997 | Vaudreuil . |
| 5,647,002 * | 7/1997 | Brunson .............................. 709/206 |
| 5,659,599 | 8/1997 | Arumainayagam et al. . |
| 5,675,507 | 10/1997 | Bobo, II . |
| 5,684,862 * | 11/1997 | Finnigan ........................... 379/88.22 |
| 5,737,395 * | 4/1998 | Irribarren ......................... 379/88.13 |
| 5,740,231 * | 4/1998 | Cohn et al. ....................... 379/88.22 |
| 5,832,221 * | 11/1998 | Jones ................................... 709/206 |
| 6,097,791 * | 8/2000 | Ladd et al. ....................... 379/88.19 |

OTHER PUBLICATIONS http://www.octel.com/unified.messenger/learn.it.html, "Learn About It", Octel Communications Corporation, 4 pages.
http://www.octel.com/unified.messenger/arch.uth.html, "The Architecture", Octel Communications Corporation, 4 pages.
http://www.octel.com/unified.messenger/hwc.html, "How Do We Compare?", Octel Communications Corporation, 4 pages.
Company Press Release, "Optus, Lucent Technologies Team Up to Bring Unified Fax and Voice Messaging to Microsoft Exchange Server", *PRNewswire*, Source: Optus Software, Inc., Mar. 3, 1998, 2 pages.
Fuertsch, P., "Advanced Messaging Offers Growing List of Technology Choices", *Special Focus*, Penton Publishing, Inc., Cleveland, Ohio, 1997, 3 pages.
Fuertsch, P., "Universal Messaging: Taming the Multimedia Frontier", *Unisphere*, May 1997, 3 pages.
Hurwicz, M., "The Universal Inbox", *Byte*, Sep. 1997, 75–79.

* cited by examiner

Primary Examiner—Fan Tsang
Assistant Examiner—Roland G. Foster
(74) Attorney, Agent, or Firm—Woodcock Washburn Kurtz Mackiewicz & Norris; Mark T. Starr; Lise A. Rode (57) ABSTRACT

A system and method for the provisioning of subscribers of a first communications network, such as a voice messaging system, to a second communications network, such as an e-mail messaging system. An exemplary system and method is described in which subscribers to a universal voice messaging system (UVMS) which handles voice and fax messages are provisioned to a message handling system (MHS) which handles e-mail messages. A message handling system provision service (MPS) provides the provisioning of the first network's subscribers to the second network. Thus, data is provisioned at a first messaging system and is forwarded to a second messaging system. Additional data for the subscriber from the second messaging system is returned to the first messaging system.

21 Claims, 3 Drawing Sheets

SYSTEM AND METHOD OF PROVISIONING SUBSCRIBERS IN A MESSAGING ENVIRONMENT COMPRISING TWO MESSAGING SYSTEMS

FIELD OF THE INVENTION

The present invention relates in general to an integrated platform for a communications system which handles a plurality of information messaging services, including a voice mail messaging service, a facsimile processing service, and an e-mail messaging service. More particularly, the present invention relates to a system and method for the provisioning of subscribers of a first communications network, such as a voice mail messaging system, to a second communications network, such as an e-mail messaging system.

BACKGROUND OF THE INVENTION

In a typical messaging system, such as a voice-mail messaging system, it is necessary to "provision" new subscribers to the messaging service. Provisioning is the process of supplying subscribers with a mailbox and a specific set of features to enable telecommunications services. Provisioning of new subscribers is typically performed by a system administrator using some form of screen interface to enter information about the subscriber. For example, a screen interface provided to the system administrator allows the system administrator to enter information including, for example, the subscriber's last name, first name, class of service, telephone number, address, etc. Once this information is entered, the system then creates a "mailbox" for the subscriber on the system. At this point, the subscriber is able to begin using the messaging features of the system and can, for example, dial into the system to retrieve messages.

Recently, a number of messaging system providers have begun to develop "universal messaging" solutions that provide some form of integrated voice, fax, and e-mail messaging. Rather than design a completely new system, one approach to universal messaging involves combining an existing voice/fax messaging system with an existing e-mail messaging system, and providing the necessary logic and user-interfaces to make these two systems appear to be tightly integrated.

Universal messaging describes a level of messaging integration that gives users access to all available message types from the device of choice. There are two design approaches—unified and integrated—that fulfill the same goal. Unified messaging manages and stores all message types in one repository; integrated messaging uses messaging protocols for communication and coordination between separate message stores. Microsoft's Messaging Application Programming Interface (MAPI) is prevalent in the unified architecture, while the integrated architectures typically use a Common Messaging Call (CMC) API.

Universal messaging provides e-mail and voice-mail service in a network environment, such as a Microsoft Windows NT network or a TCP/IP network. Universal messaging allows the exchange of e-mail messages with "foreign" systems through the use of standardized protocols, such as the X.400 and SMTP protocols, and often makes use of the open architecture of the CMC API. This allows PC client applications to make messaging requests to universal messaging service providers and also allows ClearPath/NX applications to invoke universal messaging services such as message store functions and address resolution. Universal messaging provides one view of a user's messages, with access from any device and through any access method. Thus, a universal messaging subscriber can access his voice, fax, and e-mail messages from such diverse devices as the telephone handset, a PC messaging client such as MS Exchange, or an internet web browser.

Many universal solutions suffer from fragmented administration and message stores. For example, a new user may have to be added to a voice-mail system and an e-mail system as a separate manual operation. System administrators configure, support, and maintain two separate networks, mailboxes, and directories. The interaction between two messaging systems is readily feasible if each side has sufficient detailed information about each subscriber to allow it to accomplish its various integrated functions. The information could be provided separately to each of the messaging systems, but this requires the administrator to provide the information twice. This is not only a burden on the administrator, but it also introduces additional opportunity for data errors and data synchronization problems between the two environments.

Thus, a disadvantage of this combined system approach of universal messaging is that when a new subscriber wishes to receive this service, the system administrator must provision the subscriber on both the voice/fax mail system and the e-mail system. Both systems are likely to have their own interface screens for this purpose, and it is cumbersome for a system administrator to have to enter much of the same information on both systems. The present invention provides a solution to this problem.

SUMMARY OF THE INVENTION

The present invention is directed to a system for provisioning subscribers in a message environment, comprising: a first messaging system providing information services to the subscribers including first subscriber information storage means and first message storage means for storing a first plurality of messages; a second messaging system providing information services to the subscribers including second subscriber information storage means and second message storage means for storing a second plurality of messages, the first and second messaging systems being different types of systems; provisioner means for receiving subscriber information at the first messaging system; and message handling system provisioning service provider (MPS) means coupled to the first and second messaging systems for transferring the subscriber information to the second messaging system from the provisioner means. Preferably, the first messaging system comprises at least one of a voice-mail and a fax service, and the second messaging system comprises an e-mail service, and the MPS means has a single entry point.

According to one aspect of the present invention, the second messaging system includes: universal messaging administration program means for modifying the second subscriber information storage means; a message transfer agent to control the routing of the messages stored in the second message storage means; a reliable transfer service element to control message transfers through a network between the second message storage means and other additional messaging systems; addressing services means for controlling access to the second subscriber information storage means; a protocol interpreter to encode and decode the messages stored in the second message storage means; message store provider means for controlling access to the second message storage means; and a common messaging call application programming interface (CMC API) to allow the first messaging system as well as other applications to access the messages stored in the second message storage means.

In accordance with an aspect of the present invention, the system further comprises addressing services storage means and network application platform means coupled to the provisioner means, the network application means for retrieving addressing services data from the addressing service storage means, preparing a data array, and providing the data array to the MPS means.

In accordance with a further aspect of the present invention, the system further comprises pass-through and protection means disposed between the first messaging system and the second messaging system for isolating the first subscriber information storage means and the first message storage means from the second subscriber information storage means and the second message storage means.

In accordance with a further aspect of the present invention, the subscriber information is provided to the provisioner means by a system administrator or a computer file.

In a further embodiment within the scope of the present invention, a method for provisioning subscribers in a message environment is described which comprises the steps of: receiving a provisioning request at provisioner means of a first messaging system, the first messaging system providing information services to the subscribers and including first subscriber information storage means and first message storage means for storing a first plurality of messages; receiving subscriber information at the provisioner means of the first messaging system; forming a data array containing the subscriber information; and transmitting the data array to a second messaging system via message handling system provisioning service provider (MPS) means, the second messaging system providing information services to the subscribers and including second subscriber information storage means and second message storage means for storing a second plurality of messages, and the first and second messaging systems being different types of systems.

According to another aspect of the present invention, the provisioning request is one of an add, delete, and modify subscriber information request.

According to another aspect of the present invention, the method further comprises the step of retrieving addressing services data from addressing service storage means prior to forming the data array.

According to another aspect of the present invention, the method further comprises the step of transmitting further subscriber information from the second messaging system to the first messaging system subsequent to transmitting the data array to the second messaging system.

According to another aspect of the present invention, the method further comprises the step of transmitting the data array through pass-through and protection means prior to the step of transmitting the data array to the second messaging system, the pass-through and protection means disposed between the first messaging system and the second messaging system for isolating the first subscriber information storage means and the first message storage means from the second subscriber information storage means and the second message storage means.

According to another aspect of the present invention, the method further comprises the step of creating a subscriber information template prior to the step of receiving subscriber information at the provisioner means.

In a further embodiment within the scope of the present invention, a system for provisioning subscribers of a first messaging system to a second messaging system is provided, the first messaging system providing a first set of messaging services to the subscribers and including a store of first subscriber information and a first plurality of subscriber messages, the second messaging system providing a second set of messaging services to the subscribers and including a store of second subscriber information and a second plurality of subscriber messages, the first and second sets of messaging services being different, comprising: a first provisioner for receiving data to be used in provisioning the first and second messaging systems; an addressing services database containing addressing services data; a network application platform (NAP), coupled to the first messaging system, including means for retrieving addressing services data from the addressing services database and arranging the addressing services data along with the data received via the provisioner into a data array for use by the MPS; a pass-through and protection mechanism comprising means for protecting the store of first subscriber information from the store of second subscriber information; and a message handling system provisioning service provider (MPS) operatively coupled to the pass-through and protection mechanism and to the second messaging system, wherein the MPS provisions the second messaging system with information received via the first provisioner and the pass-through and protection mechanism.

According to another aspect of the present invention, the first provisioner accesses the addressing services database and the pass-through and protection mechanism when sending data to the MPS to be provisioned on the second messaging system.

According to another aspect of the present invention, the MPS serves as an entry point for the first messaging system to call to pass subscriber information to the second messaging system, wherein on return from the entry point the second messaging system provides the first messaging system with additional subscriber information including a global unique identifier that both messaging systems use to identify subscribers.

According to another aspect of the present invention, the first messaging system further includes means for updating the addressing services database with information concerning one or more subscribers' mailboxes.

The foregoing and other aspects of the present invention will become apparent from the following detailed description of the invention when considered in conjunction with the accompanying drawing.

DETAILED DESCRIPTION OF THE PREFERRED EMBODIMENTS

The present invention is directed to a system and method for the provisioning of subscribers of a first communications network (such as a voice messaging system) to a second communications network (such as an e-mail messaging system). An exemplary system and method is described in which subscribers to a universal voice messaging system (UVMS) which handles voice and fax messages are provisioned to a message handling system (MHS) which handles e-mail messages. A message handling system provision service (MPS) acts as an interface and provides the provisioning of the first network's subscribers to the second network. Thus, data is provisioned at a first messaging system and is forwarded to a second messaging system. Additional data for the subscriber from the second messaging system is returned to the first messaging system.

The present invention uses a single point of entry (i.e., the MPS) to receive and provision subscriber information that is either entered by a system administrator or is retrieved from a database or a compiled list. Information is obtained for a first messaging system (voice/fax) and sent to a second messaging system (e-mail). The present invention provides a protocol interface for the second messaging system.

Figure 1:
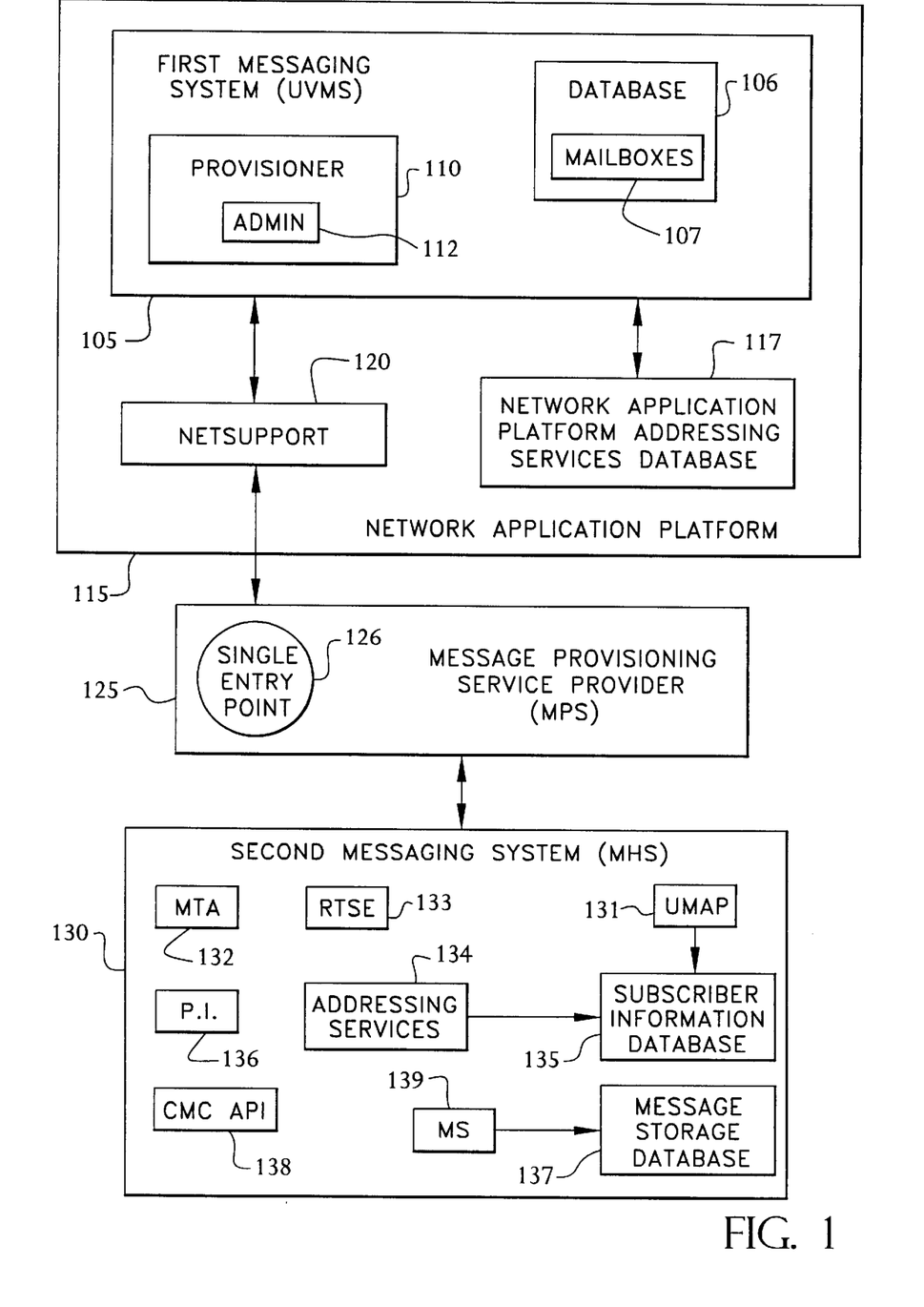
FIG. 1 is a functional block diagram of an exemplary provisioning system for a first and a second messaging system in accordance with the present invention.

FIG. 1 shows a preferred implementation of the system of the present invention. A first messaging system, such as a universal voice messaging system, or UVMS, 105 is a stand-alone application, contained within a network application platform (NAP) 115, which preferably handles voice-mail and faxmail, and comprises a database 106 which contains subscriber information. Each subscriber to the UVMS 105 has a mailbox 107 within the database 106 which stores that subscriber's voice and fax messages. The UVMS 105 further comprises a provisioner 110 that is used to receive data to provision the system. The present invention preferably operates in an X.400 environment (an international standard for enabling disparate e-mail systems to communicate with each other), but can be used with any protocol. The UVMS 105 is preferably accessible to subscribers at all times.

An administration program (ADMIN) 112 is provided within the provisioner 110 and is used to administer the voice/fax mail system and subscribers. The ADMIN 112 provides for both the computer batch file and screen (system administrator) inputs for administering subscribers. The ADMIN 112 assigns a mailbox 107 to each subscriber that stores the subscriber's voice and fax messages in the UVMS 105. The UVMS features that can be used by a subscriber are determined by the class of service assigned to the subscriber's mailbox 107. A class of service is an administratively created set of parameters for UVMS features that is assigned to each mailbox and defines the capabilities enabled for the mailbox. Preferably, screens are used to administer subscriber mailboxes and their class of service options. Mailbox subscriber screens are used to enter subscriber information. Administrative screens allow for the complete setup of subscriber mailboxes prior to initialization.

The UVMS 105 retrieves addressing services data (e.g., country code, domain node, and partition node) from a NAP addressing services database 117 and arranges that data as well as the data received via the provisioner 110 into a data array that is sent to the message handling system provisioning service provider, or MPS, 125 of the present invention. Optionally, the system administrator can use the UVMS 105 to provision individual subscribers online. The UVMS 105 also takes a file containing information about one or more subscribers' mailboxes and updates the NAP addressing services database 117 with the mailbox information. Furthermore, the UVMS 105 produces a file that reports the current data for each mailbox involved in the update. When requested to update the SMTP address for a subscriber, the NAP 115 changes the corresponding name and address accordingly. This is desirable so that the addresses for the subscriber on the two messaging systems 105 and 130 are coordinated with one another so as to be compatible with an address conversion mechanism.

The MPS 125 is the provisioning mechanism for the second messaging system, such as a message handling system, or MHS, 130. In the preferred embodiment, e-mail subscriber information resides in a database 135 of the second messaging system, hereinafter referred to as the subscriber information database 135. A pass-through and protection mechanism, called netsupport 120, comprises protective code that protects the UVMS 105 runtime environment from the MHS 130 runtime environment. The provisioner 110 accesses the NAP addressing services database 117 and netsupport 120 when sending data to the MPS 125 to be provisioned on the MHS 130.

As described above, the second messaging system is preferably a message handling system, MHS 130, and is a component of universal messaging comprising a store and forward e-mail handling system. The subscriber information database 135 is updated to include the provisioned subscriber data. The MHS 130 provides an entry point (i.e., the MPS 125) for the first messaging system to call to pass subscriber information. Likewise, on return from this entry point, the MHS 130 provides the UVMS 105 with additional subscriber information such as a global unique identifier that both sides use to identify the subscriber. The UVMS 105 calls the MPS 125 every time a subscriber is added, changed, or deleted. The administrator collects data (e.g., country code, name, mailbox, etc.) and enters it along with the services desired (fax, voice-mail, etc.). After this information is gathered, the subscriber information is sent to the MPS 125. For each request, the MPS 125 updates the subscriber information database 135 accordingly. This enables this subscriber information to be available for use by the MHS 130.

The system further comprises a universal messaging administration program (UMAP) 131. The UMAP 131 is a graphical user interface tool that provides a means for the administrator to add, change, delete, and view an MHS configuration, addressing, and user data contained in the subscriber information database 135. The UMAP 131 runs within the second messaging system environment to preferably allow the administrator to create a "template" reflecting the simple mail transport protocol (SMTP) domain name to be used to construct the subscriber's SMTP address, and the default name components to be used to construct the subscriber's name.

The UMAP 131 preferably uses a universal messaging graphical user interface utility to create the server template. The data fields are filled in on this template in order to allow the creation of a profile, together with any other name component fields desired for the appropriate routing of incoming messages to the subscriber mailboxes. Also, the system administrator specifies a valid SMTP domain name for this template to allow the appropriate creation of SMTP addresses for UVMS subscribers by the MPS 125. The name components and SMTP domain name in the server template desirably match the address conversion mapping values.

The MHS 130 preferably comprises the UMAP 131, a message transfer agent (MTA) 132, a reliable transfer service element (RTSE) 133, addressing services 134, a message store provider (MS) 139, a protocol interpreter (P.I.) 136, a CMC API 138, a subscriber information database 135, and a message storage database 137.

The message transfer agent 132 controls the routing of messages to applications on the local computer system or on other systems in the network. The RTSE 133 performs the system to system message transfers, either as the initiator (sender) or passive side (receiver) of the transfers. The addressing services 134 controls access to the subscriber information database 135. A set of records, called a profile, is kept in the database 135 for each UVMS subscriber.

The message store provider 139, together with the message storage database 137, provides a repository for e-mail messages and maintains mail folders for each subscriber. The message store provider 139 also provides a means for submitting messages to local recipients or non-local recipients via the SMTP and/or other protocol networks. The message store provider 139 optionally notifies the UVMS 105 of the arrival of e-mail for a subscriber. The protocol interpreter 136 performs encoding and decoding services for the message store provider 139.

The CMC API 138 provides a MAPI-like programmatic interface to the MHS messaging services 130. The UVMS 105 uses this CMC interface 138 to access e-mail messages in the MHS message storage database 137.

The provisioning service provider, MPS 125, is called via a single entry point 126 to modify the subscriber information residing in the subscriber information database 135. The subscriber information can be added, changed, or deleted from the database 135. The provisioner 110 preferably passes control to the MPS 125 whenever a subscriber is to be added, changed, or deleted. It should be noted that certain data can be changed during the provisioning. However, care should be taken so that the two messaging environments remain synchronized.

Figure 2:
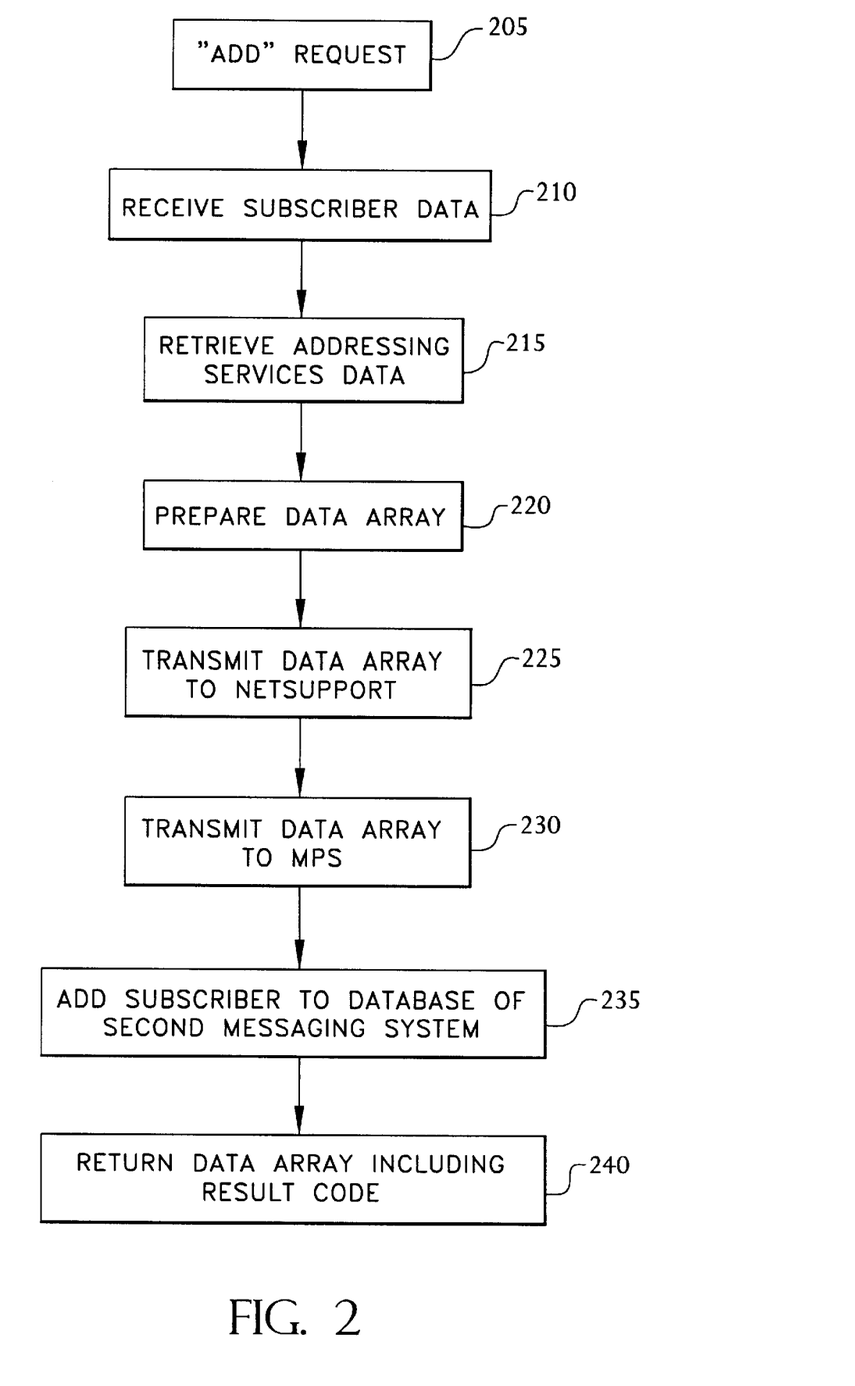
FIG. 2 is flow diagram of an exemplary method of adding a subscriber to a second messaging system via a provisioner of a first messaging system in accordance with the present invention.

FIG. 2 shows an exemplary method for provisioning new subscribers of a first messaging system, such as the UVMS 105, to a second messaging system, such as the MHS 130. The MPS 125 is callable by the UVMS 105 and the provisioner 110 via a connection library interface. A connection library is a set of callable procedures that establish and maintain connections to a piece of hardware or software. An add request is received at the provisioner 110, as shown by step 205. At step 210, the provisioner 110 receives subscriber data, either from a system administrator or a computer batch file. The administrator can set/modify provisioning values for subscribers. Exemplary data fields include SMTP domain, name components, country, domain node, partition node, and organization. The provisioner 110 passes subscriber information, as well as the function (e.g., add, change, delete) being requested, to the NAP addressing services database 117. This allows information on one NAP server to be propagated through the network, if desired, to other NAP servers via the NAP networking distribution process. The subscriber information passed by the provisioner 110 is used by the MPS 125 to create, change, or remove objects in the subscriber information database 135. These database objects make up the MHS profile for the subscriber.

At step 215, a call is made to the NAP addressing services database 117 to retrieve the NAP addressing services parameters, such as country code, domain node, and partition node. A data array comprising the NAP addressing services parameters and the data received from the provisioner 110 is formulated at step 220 and passed to the netsupport 120 at step 225. The data array that is passed contains the data desired for the MPS 125 to create a profile for the subscriber.

At step 230, the netsupport library 120 passes the data array to the MPS 125. Netsupport 120 calls the MPS 125, and preferably passes an EBCDIC (Extended Binary Coded Decimal Interchange Code) array to the MPS 125. The parameter list sent to netsupport 120 comprises one set of data, that is, an array containing the function, profile identifier, provisioning data, returned data, and result code. Specifically, the array can contain the function, the profile identifier, the name of a subscriber, the mailbox country, telephone number with extension, guest number, country code, local nodes and various system flags, addresses, and codes. The MPS 125 adds the subscriber to the subscriber information database 135 at step 235 and returns result codes which indicate success or failure, at step 240. In addition to the data passed by the UVMS 105, the MPS 125 retrieves global (i.e., applicable to all subscribers) data from its database (not shown) which it uses in building the subscriber's e-mail profile. An example is the SMTP domain name that the MPS 125 uses in building the subscriber's X.400/SMTP address.

Preferably, the MPS 125 returns meaningful data to the UVMS 105 such as a result code or updated SMTP address data. If the function is successful, a unique identifier for the subscriber's e-mail profile is passed back in a data array to the UVMS 105. The data array comprises data pertaining to the subscriber, such as a profile identifier, the subscriber's SMTP address, and a return code indicating the success or failure of the call.

The system of the present invention can run in either the batch mode or the administrative mode. The batch mode is used to provision previously stored or compiled subscribers of the first messaging system to the second messaging system. The administrative mode is used to provision a subscriber to the system, online and in real-time. The MPS 125 is called by the provisioner 110 regardless of the mode in which the system is being run. In the administrative mode, after the system administrator has entered the provisioning information to the NAP addressing services database 117 through the provisioner 110, the present invention provisions the subscriber data in the subscriber information database 135.

The provisioner 110 calls netsupport 120 whether running in batch mode or administrative mode. As described above, the netsupport 120 is an application, preferably ALGOL based, used by the UVMS 105 to maintain systemwide data in memory arrays. This allows for quicker access to data, such as class of service data or systemwide data (e.g., data which does not vary among subscribers). Regarding the provisioning of subscriber data to the MPS 125, the netsupport 120 is used as a "buffer" or safety mechanism between UVMS 105 and MHS 130. By using netsupport 120, the universal voice messaging system 105 is protected from being affected in the event that the MHS 130 experiences some problems or terminates abnormally.

The UVMS 105 calls the MPS 125 via a connection library interface, and calls the NAP addressing services database 117 via a connection library interface. This prevents the termination of one of these processes from causing the termination of the others. Also, the MPS 125 is designed to execute with just one worker task, thus eliminating the complexity of a multi-worker-task approach. Inter-task control is accomplished via wait/cause event mechanisms. Also, a connection library approval procedure ensures that only one calling task is connected to the MPS 125 at one time.

As stated above, the provisioner 110 can also run in a batch mode instead of the administrative mode. A file, conforming to a predetermined layout, is read by the provisioner 110. The values in the data file are a subset of those values in the mailbox subscriber screens. The customer creates a batch file containing the mailbox information and inputs this data to the provisioner 110. The provisioner 110 processes the data and updates the UVMS database 106 and the subscriber information database 135 with the same results as if the information were entered directly into the system using administrative screens.

Pre-existing UVMS subscriber information can be extracted from the UVMS 105 and provisioned to the MPS 125 in order to create profile records in MHS 130 for all UVMS subscribers. In other words, the MPS 125 can be used to provision large numbers of subscribers from the first messaging system. Preferably, subscribers are provisioned serially. The MPS 125 is invoked via a connection library interface. Any appropriately coded program can make use of the MPS services. Preferably, the MPS 125 is coded in ALGOL, although any computer programming language can be used.

The MPS 125 works in conjunction with the provisioner 110 in the creation, updating, and deletion of subscriber information in the subscriber information database 135. The subscriber information is contained in several database 135 records, which together make up the subscriber's "profile". The same parameter list is used for the add, change, and delete functions, although specific parameters may not be used for all the functions. Preferably, more than one task is prevented from being connected at the same time to the MPS 125.

In order to provide the integrated voice, electronic, and fax messaging capability preferred in universal messaging, it is desirable that the UVMS 105 know about e-mail messages, and likewise that the MHS 130 know about voice and fax messages. Further, it is also desirable that these two sides know details, such as name, telephone number, global identifier, and enabled services, about the subscribers that "own" these messages.

For example, when a user calls in for his messages, the UVMS 105 uses the CMC interface to ask the MHS 130 for information about any new e-mail messages that have arrived for this subscriber. The UVMS 105 uses the subscriber's identifier, also known as a globally unique identifier, to identify the subscriber on behalf of which the request is being made. The globally unique identifier is assigned to the subscriber by MHS 130 during the provisioning process, and is passed back to the UVMS 105 at that time for storage in the UVMS database 106.

The add subscriber, change subscriber, and delete subscriber procedures within the UVMS call the MPS 125 via a connection library interface. This prevents the termination of one of these processes from causing the termination of the other. All add subscriber, change subscriber, and delete subscriber processing is performed under the same worker task. Also, a connection library approval procedure ensures that only one calling task is connected to the MPS 125 at one time.

An add subscriber procedure is called when the MPS 125 has been invoked to add a UVMS subscriber to the subscriber information database 135, and is similar to the procedure shown in FIG. 2. The add subscriber procedure creates the appropriate records in the various database data sets to reflect the provisioned data passed by the UVMS 105. When a subscriber is provisioned in the first system, the UVMS 105 calls the MPS 125 with a subset of the subscriber data, such as requested function (add), first name, last name, middle initial, phone number and extension, guest number, associated country code/administrative management domain/private management domain, and e-mail boolean flag. The MPS 125 returns to the UVMS 105 certain data, such as, for example, the unique identifier for this user, the subscriber's SMTP address, and the result code for the caller's request. If the requested function is an add, and if it is successful, the MPS 125 produces a report of all pertinent data on the subscriber in question. The report can preferably be viewed via a standard system editor.

Figure 3:
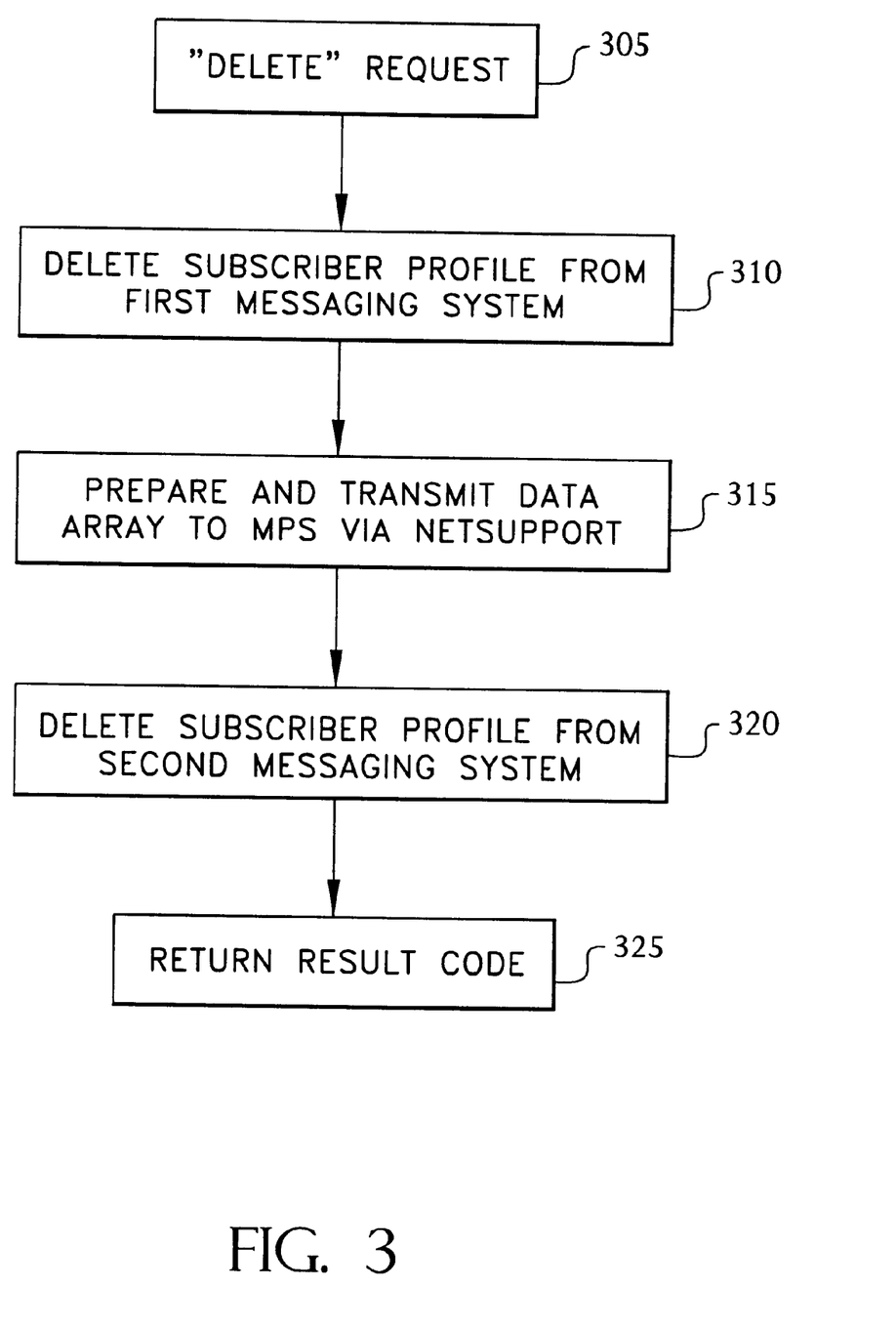
FIG. 3 is flow diagram of an exemplary method of deleting a subscriber from a second messaging system via a provisioner of a first messaging system in accordance with the present invention.

An exemplary delete subscriber procedure is shown in FIG. 3 and is called at step 305 when the MPS 125 has been invoked to delete a subscriber of the first messaging system from the database 135 of the MHS 130. At step 310, the delete subscriber routine deletes the subscriber's profile record and all related records in the UVMS database 106. The subscriber's mailbox, and all messages therein, is also removed. A data array is formed and passed to the subscriber information database 135 at step 315 by calling the same entry point with the requested function set to delete and the unique identifier passed along to identify the user to be deleted. For the delete case, the MPS 125 deletes the subscriber's profile and all associated subscriber information database 135 records at step 320, and also the subscriber's e-mail mailbox and its contents are removed. The MPS 125 returns a result code to the UVMS 105 at step 325. Thus, subscribers are automatically deleted from the MPS 125 when they are deleted from the UVMS 105 via the delete function being passed in the data array to the MPS 125.

The change subscriber procedure is called when the MPS 125 has been invoked to change a UVMS subscriber on the subscriber information database 135 and is similar to that shown in FIG. 3 except that the data is not deleted, it is changed. The change subscriber routine updates the appropriate records in the various database data sets to reflect the provisioned data passed by the UVMS 105. For example, if the subscriber changes status from "universal messaging enabled" to "universal messaging not enabled", or vice versa, then appropriate service records in the database are updated to reflect this new status. The UVMS 105 will supply a complete set of data in the provision data array, regardless of the nature of the requested change. When subscriber information is updated, the MHS-pertinent changes (if any) are provided to the subscriber information database 135 by calling the same entry point with the requested function set to change. In this case, the unique identifier is desirably passed along with the modified data. The MPS 125 returns a result code to the UVMS 105.

Certain information if changed in the UVMS 105 is forwarded to the MPS 125 to be reflected in the MHS database 130. For example, when a name is changed, a change command is issued to the MPS 125. The same data array is passed, and all valid data, including changed data, is to be filled in. The MPS 125 makes the appropriate changes (e.g., name change), and returns a result value to the UVMS 105 indicating success or failure.

If a subscriber's name is changed, preferably only the display-name in the profile's record is changed. The subscriber's profile name, SMTP address, X.400 O/R name and X.400 address remain unchanged; i.e., they remain as they were when the subscriber was added. This enables a UVMS subscriber to change his name without having to also change his SMTP address, X.400 address, or web logon id, for example.

In addition to provisioning requests from a first system to a second system, the MPS 125 also creates an administrative mail profile, as desired. The MPS 125 checks at each initialization and after each provisioning request for the existence of the profile. If it does not exist, the MPS 125 creates it.

An X.400 and SMTP address naming convention for the subscriber is implemented and mapping takes place for conversion in either direction. Preferably, conventional naming elimination/truncation rules are implemented to avoid generating identical names for different subscribers.

Preferably, when the MPS 125 encounters an error during processing, it writes a record to the system log file to report the error condition, and also returns an error code in the procedure result function.

When the number of mailboxes in a network application exceeds the capacity of a machine, or when the geographical separation between the subscriber and the machine becomes impractical, multiple machines may be used, logically linked into a network. The NAP 115 facilitates the movement of messages within the network. The NAP addressing services database 117 provides a networkwide directory of the mailboxes and an administration utility for directory updates. A distribution application provides a reliable transfer service for those updates.

The present invention can be used with any universal messaging environment, and is not limited to the UVMS and MHS systems described in the above exemplary embodiment. The present invention saves time and reduces data entry, thereby reducing the potential for erroneous data entry.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. A system for provisioning subscribers of a messaging system, comprising:

a first messaging system providing information services to the subscribers including first subscriber information storage means and first message storage means for storing a first plurality of messages;

a second messaging system providing information services to the subscribers including second subscriber information storage means and second message storage means for storing a second plurality of messages, said first and second messaging systems being different types of systems;

provisioner means for receiving subscriber information at said first messaging system; and message handling system provisioning service provider (MPS) means coupled to said first and second messaging systems for transferring said subscriber information to said second messaging system from said provisioner means, wherein said MPS serves as an entry point for said first messaging system to call to pass subscriber information to said second messaging system, wherein on return from said entry point said second messaging system provides said first messaging system with additional subscriber information including a global unique identifier that both messaging systems use to identify subscribers.

2. The system according to claim 1, wherein said first messaging system comprises at least one of a voice-mail and a fax service, and said second messaging system comprises an e-mail service.

3. The system according to claim 1, further comprising addressing services storage means and network application platform means coupled to said provisioner means, said network application platform means for retrieving addressing services data from said addressing service storage means, preparing a data array, and providing said data array to said MPS means.

4. The system according to claim 3, further comprising pass-through and protection means disposed between said first messaging system and said second messaging system for isolating said first subscriber information storage means and said first message storage means from said second subscriber information storage means and said second message storage means.

5. The system according to claim 1, wherein said subscriber information is provided to said provisioner means by a system administrator.

6. The system according to claim 1, wherein said subscriber information is provided to said provisioner means from a computer file.

7. The system according to claim 1, wherein said second messaging system includes:

universal messaging administration program means for modifying said second subscriber information storage means;

message store provider means for controlling access to said second message storage means;

a message transfer agent to control the routing of said messages stored in said second message storage means;

a reliable transfer service element to control message transfers between said second messages storage means and additional messaging systems;

addressing services means for controlling access to said second subscriber information storage means;

a protocol interpreter to encode and decode said messages stored in said second message storage means; and a common messaging call application programming interface (CMC API) to allow said first messaging system to access said messages stored in said second message storage means.

8. The system according to claim 1, wherein said first messaging system has a first protocol and said second messaging system has a second protocol, said first and second protocols being the same.

9. The system according to claim 1, wherein said first messaging system has a first protocol and said second messaging system has a second protocol, said first and second protocols being different.

10. The system according to claim 1, wherein said MPS means has a single entry point.

11. A method for provisioning subscribers in a messaging system, comprising the steps of:

receiving a provisioning request at provisioner means of a first messaging system, said first messaging system providing information services to the subscribers and including first subscriber information storage means and first message storage means for storing a first plurality of messages;

receiving subscriber information at said provisioner means of said first messaging system;

forming a data array containing said subscriber information;

transmitting said data array to a second messaging system via an entry point provided by a message handling system provisioning service provider (MPS) means, said second messaging system providing information services to the subscribers and including second subscriber information storage means and second message storage means for storing a second plurality of messages, and said first and second messaging systems being different types of systems; and transmitting further subscriber information, including a global unique identifier that both messaging systems use to identify subscribers, from said second messaging system to said first messaging system.

12. The method according to claim 11, wherein said step of receiving subscriber information includes one of receiving said subscriber information from a system administrator and receiving said system information from a computer file.

13. The method according to claim 11, wherein said provisioning request is one of an add, delete, and modify subscriber information request.

14. The method according to claim 11, further comprising the step of retrieving addressing services data from addressing service storage means prior to forming said data array.

15. The method according to claim 11, further comprising the step of transmitting said data array through pass-through and protection means prior to said step of transmitting said data array to said second messaging system, said pass-through and protection means disposed between said first messaging system and said second messaging system for isolating said first subscriber information storage means and said first message storage means from said second subscriber information storage means and said second message storage means.

16. The method according to claim 11, further comprising the step of creating a subscriber information template prior to said step of receiving subscriber information at said provisioner means.

17. A system for provisioning subscribers of a first messaging system to a second messaging system, said first messaging system (105) providing a first set of messaging services to the subscribers and including a store (106, 107) of first subscriber information and a first plurality of subscriber messages, said second messaging system (130) providing a second set of messaging services to the subscribers and including a store (135, 137) of second subscriber information and a second plurality of subscriber messages, said first and second sets of messaging services being different, comprising:

a first provisioner (110) for receiving data to be used in provisioning said first and second messaging systems;

an addressing services database (117) containing addressing services data;

a network application platform (NAP) (115), coupled to said first messaging system (105), including means for retrieving addressing services data from said addressing services database (117) and arranging said addressing services data along with said data received via said first provisioner (110) into a data array for use by an MPS;

a pass-through and protection mechanism (120) comprising means for protecting said store of first subscriber information from said store of second subscriber information; and said message handling system provisioning service provider (MPS) (125) operatively coupled to said pass-through and protection mechanism (120) and to said second messaging system (130), wherein said MPS provisions said second messaging system with information received via said first provisioner (110) and said pass-through and protection mechanism (120), wherein said MPS (125) serves as an entry point for said first messaging system (105) to call to pass subscriber information to said second messaging system (130), wherein on return from said entry point said second messaging system (130) provides said first messaging system (105) with additional subscriber information including a global unique identifier that both messaging systems use to identify subscribers.

18. A system as recited in claim 17, wherein said first provisioner (110) accesses said addressing services database (117) and said pass-through and protection mechanism (120) when sending data to said MPS (125) to be provisioned on said second messaging system (130).

19. A system as recited in claim 17, wherein said first messaging system (105) calls said MPS (125) every time a subscriber is added, changed, or deleted.

20. A system as recited in claim 17, wherein said first messaging system (105) further includes means for updating said addressing services database (117) with information concerning one or more subscribers' mailboxes.

21. A system as recited in claim 17, wherein said first messaging system (105) comprises at least one of a voice-mail and a fax service, and said second messaging system (130) comprises an e-mail service.

\* \* \* \* \*